US010885381B2

(12) United States Patent
Deng (10) Patent No.: US 10,885,381 B2
(45) Date of Patent: Jan. 5, 2021

(54) SHIP DETECTION METHOD AND SYSTEM BASED ON MULTIDIMENSIONAL SCENE FEATURES

(71) Applicant: ZHUHAI DA HENGQIN TECHNOLOGY DEVELOPMENT CO., LTD., Zhuhai (CN)

(72) Inventor: Lianbing Deng, Zhuhai (CN)

(73) Assignee: ZHUHAI DA HENGQIN TECHNOLOGY DEVELOPMENT CO., LTD., Zhuhai (CN)

( * ) Notice: Subject to any disclaimer, the term of this patent is extended or adjusted under 35 U.S.C. 154(b) by 0 days.

(21) Appl. No.: 16/627,513

(22) PCT Filed: Dec. 11, 2018

(86) PCT No.: PCT/CN2018/120296
§ 371 (c)(1),
(2) Date: Dec. 30, 2019

(87) PCT Pub. No.: WO2019/101221
PCT Pub. Date: May 31, 2019

(65) Prior Publication Data
US 2020/0167601 A1    May 28, 2020

(30) Foreign Application Priority Data

Dec. 11, 2017    (CN) .......................... 2017 1 1311822

(51) Int. Cl.
*G06K 9/00*    (2006.01)
*G06K 9/62*    (2006.01)
(Continued)

(52) U.S. Cl.
CPC ......... *G06K 9/6223* (2013.01); *G06K 9/0063* (2013.01); *G06K 9/00751* (2013.01);
(Continued)

(58) Field of Classification Search
None
See application file for complete search history.

(56) References Cited

U.S. PATENT DOCUMENTS

2011/0026832 A1    2/2011   LeMoigne-Stewart et al.
2018/0365824 A1*  12/2018   Yuh ....................... G06T 7/0012
(Continued)

FOREIGN PATENT DOCUMENTS

CN    103514448 A    1/2014
CN    105893957 A    8/2016
(Continued)

OTHER PUBLICATIONS

Liu et al. "A High Resolution Optical Satellite Image Dataset for Ship Recognition and Some New Baselines", 6th International Conference on Pattern Recognition Applications and Methods, Jan. 2017 (Year: 2017).*
(Continued)

*Primary Examiner* — Randolph I Chu
(74) *Attorney, Agent, or Firm* — Bayramoglu Law Offices LLC (57) ABSTRACT

A ship detection method and system based on multidimensional scene features, wherein the method includes: constructing a ship image sample database, and extracting all the edges of each frame of image to act as a fourth dimension of the image; extracting a coastline to make a sea surface area be a ship area; constructing a Faster RCNN-like convolutional network to act as a deep learning network, and inputting sample data into the deep learning network; constructing an RPN network, using a sliding window to generate region proposal boxes of different sizes in the ship area, combining the region proposal boxes with the deep learning network, and training a model according to an actual position of a ship; and performing ship detection on
(Continued)

a part of the detected image between the coastline on the basis of the trained model.

8 Claims, 4 Drawing Sheets

(51) Int. Cl.
    *G06T 7/215* (2017.01)
    *G06T 7/262* (2017.01)
    *G06T 7/269* (2017.01)
    *G06T 7/73* (2017.01)
    *G06T 7/246* (2017.01)
    *G06K 9/46* (2006.01)
    *G06N 3/04* (2006.01)
    *G06N 3/08* (2006.01)
    *G06T 7/60* (2017.01)

(52) U.S. Cl.
    CPC ..... *G06K 9/00765* (2013.01); *G06K 9/00771* (2013.01); *G06K 9/4604* (2013.01); *G06N 3/0454* (2013.01); *G06N 3/08* (2013.01); *G06T 7/215* (2017.01); *G06T 7/251* (2017.01); *G06T 7/262* (2017.01); *G06T 7/269* (2017.01); *G06T 7/60* (2013.01); *G06T 7/75* (2017.01); *G06T 2207/10016* (2013.01); *G06T 2207/20061* (2013.01); *G06T 2207/20081* (2013.01); *G06T 2207/20084* (2013.01); *G06T 2207/30232* (2013.01)

(56) References Cited

U.S. PATENT DOCUMENTS

2020/0143205 A1* 5/2020 Yao ...................... G06K 9/6262
2020/0175352 A1* 6/2020 Cha ...................... G06T 7/0004

FOREIGN PATENT DOCUMENTS

| CN | 107169412 A | 9/2017 |
| CN | 107818326 A | 3/2018 |
| WO | 2017007626 A1 | 1/2017 |

OTHER PUBLICATIONS

Kang et al., "A Modified Faster R-CNN Based on CFAR Algorithm for SAR Ship Detection", 2017 International Workshop on Remote Sensing with Intelligent Processing (RSIP), May 2017 (Year: 2017).*
Moreira et al. "A survey on video detection and tracking of maritime vessels", International Journal of Signal Processing, p. 47-60 (Year: 2016).*
Yang et al. "Aerial Target Tracking Algorithm Based on Faster R-CNN Combined with Frame Differencing", aerospace, Jun. 2017 (Year: 2017).*
Xu et al. "Automatic Detection of Inshore Ships in High-Resolution Remote Sensing Images Using Robust Invariant Generalized Hough Transform", IEEE Geoscience and Remote Sensing Letters, vol. 11, No. 12, Dec. 2014 (Year: 2014).*
Bloisi et al. "Automatic Maritime Surveillance With Visual Target Detection", Department of Computer and System Sciences Sapienza University of Rome (Year: 2011).*
Zhang et al. "S-CNN-Based Ship Detection From High-Resolution Remote Sensing Images", The International Archives of the Photogrammetry, Remote Sensing and Spatial Information Sciences, vol. XLI-B7, 2016 XXIII ISPRS Congress, Jul. 12-19, 2016 (Year: 2016).*
Zou et al. "Ship Detection in Spaceborne Optical Image With SVD Networks", IEEE Transactions on Geoscience and Remote Sensing, vol. 54, No. 10, Oct. 2016 (Year: 2016).*
Brusch et al. "Ship Surveillance With TerraSAR-X", IEEE Transactions on Geoscience and Remote Sensing, vol. 49, No. 3, Mar. 2011 (Year: 2011).*
Raineya et al. , "Convolutional neural networks for ship type recognition", Proc. of SPIE vol. 9844, 984409 © 2016 (Year: 2016).*
Ngeno et al. "Ship Classification Using Faster Region Convolution Neural Network (Faster R-CNN) for Automatic Identification of Marine vessels", FIT2017, Processing Society of Japan and The Institute of Electronics, Information and Communication Engineers (Year: 2017).*
Chen, Hang et al., A Review of Ship Detection and Recognition Based on Optical Remote Sensing Image, Science & Technology Review, vol. 35, No. 20, Oct. 28, 2017, pp. 77-85.
Ren, Shaoming, et al., Faster R-CNN: Towards Real-Time Object Detection with Region Proposal Networks. IEEE Transactions on Pattern Analysis and Machine Intelligence, vol. 39, No. 6, Jun. 1, 2017, pp. 1137-1149.

* cited by examiner

SHIP DETECTION METHOD AND SYSTEM BASED ON MULTIDIMENSIONAL SCENE FEATURES

CROSS REFERENCE TO THE RELATED APPLICATIONS

This application is the national phase entry of International Application PCT/CN2018/120296, filed on Dec. 11, 2018, which is based upon and claims priority to Chinese Patent Application No. 201711311822.1, filed on Dec. 11, 2017, the entire contents of which are incorporated herein by reference.

TECHNICAL FIELD

The disclosure belongs to the field of computer vision, and relates to a ship detection method and system based on multidimensional scene feature for constructing a deep learning network model.

BACKGROUND

In modern society, video surveillance cameras can be found everywhere. It is usually seen in a surveillance center that multi-channel surveillance screens are displayed on a wall. It is easy to miss abnormal events if we only rely on human eyes to observe and detect. Researches show that professional surveillance personnel will miss 95% behaviors in 22 minutes even only surveilling two monitors, so that occurrence of criminal behaviors cannot be effectively prevented and controlled in advance. However, a smart surveillance probe improves an active early warning capability of a real-time surveillance system and sends out an early warning when relevant dangerous situations are detected, which is beneficial for relevant departments to take measures in time. On the other hand, storage records of the early warning behaviors of the smart surveillance probe on abnormalities are also valuable clues in future work such as case detection, accident cause analysis, etc.

With the rapid expansion of population and extreme shortage of land resources, the mankind has gradually accelerated the development to the sea in the $21^{st}$ century. How to make good use of and protect marine environments and resources and how to surveil vast oceans under limited manpower have become important research topics at present. An ocean video surveillance system can realize 24-hour uninterrupted surveillance, comprehensively monitor actions of passing ships and mariners, capture violations at the first time and record conditions of surrounding sea areas without interruption, thus greatly easing a work difficulty of ocean supervisors, improving a working efficiency, saving a surveillance cost, and providing a scientific basis for making an ocean management decision meanwhile.

This patent application studies how to quickly and accurately detect a moving ship from an around-island video surveillance system. Throughout current situations of target detection algorithms at home and abroad, the traditional methods such as a time domain frame difference method, an optical flow method, a background subtraction method, etc., are gradually turned to detection methods based on deep learning such as R-CNN, Fast RCNN, Faster RCNN, or the like. In the traditional methods, a time domain frame difference method is to extract two or more adjacent frames of images in a video to perform difference calculation, which is to perform difference calculation on pixels of different frames of images, and separate a background and a moving object in the image by thresholding, so as to obtain the pixels of the moving object in difference calculation image. Thresholding is to set a specific threshold for the difference calculation result, therefore distinguishing the background and the moving object. The algorithm has strong adaptability and robustness for a dynamic background when a lens is fixed. However, because of the defect of the algorithm, the pixels of the features in two adjacent frames have no large difference, by this algorithm, it is not capable to extract all relevant pixel points of a feature completely, and but can extract partial relevant pixel points of the feature, which results in that the algorithm cannot obtain high-precision detection results. When an object moves quickly, employing a larger sampling interval will cause no coverage between the two frames of images, which is prone to false detection. When the object moves slowly, a smaller sampling interval is employed; however, cavitation is easily occurred to the moving target detected, which is not beneficial for subsequent target detection. The cavitation is that the pixels inside the object is considered as the background, it is not extracted by difference calculation because the pixels in two adjacent frames are not changed.

In the deep learning method, the RCNN is a network with a CNN feature region, which uses a feature getting by convolutional neural network for the whole image's pixels' classification for the first time. An image is inputted, about 2,000 candidate regions in an image are acquired by a region proposal method of selective search (SS) the candidate region is referred to the region which may include the object, and then a CNN feature of each feature region is extracted. Then, a SVM classifier is used to classify each region, and a final classification result is finally determined according to a threshold. The threshold maybe a value specified by user, such as 0.5. However, the method has a poor efficiency, and needs about 2 seconds for one image in a CPU mode, which is mainly because that the CNN will perform separate feature extraction on each region proposal during feature extraction, which leads to a significant increase in the time consumed.

The Fast RCNN network inputs an image and an object proposal box thereof, which is the candidate region above, and then performs convolution and max-pooling on the image to obtain a feature map needed by the application. The Fast RCNN proposes a new network layer structure ROI Pooling layer to unify scale of these results into feature vectors with a fixed length. Then, these feature vectors are inputted to a fully connected layer and then inputted to a multi-task model, which is formed by a softmax classifier and a bbox regressor combination while the above two layers can share features, so that better results can be obtained by performing fine adjustment on the two layers for mutual promotion. The Fast RCNN can be realized on a GPU. Although an efficiency is improved, a subsequent detection network is not considered and a region proposal part consumes too much time which is not solved well.

The Faster RCNN uses a region proposal network (RPN)+ fast RCNN to make a region proposal. The region proposal network here shares convolutional features with the detection network, and these convolutional layer features are used to predict the region proposal boxes; in this way, a calculation cost for generating the region proposal boxes is very low. Then, these regions are used for Fast R-CNN detection, so that an accuracy of the detection is similar to that of the Fast R-CNN, but a speed of the detection is much faster. However, the accuracy is still insufficient.

SUMMARY

In view of the defects of the prior art and with reference to data features of a around-island surveillance system, the disclosure provides a ship detection technical solution based on multidimensional scene features for constructing a deep learning network model.

In order to achieve the above object, the technical solution of the disclosure is a ship detection method based on multidimensional scene features for constructing a deep learning network model, including the following steps:

step A: constructing a ship image sample database, which includes collecting coastal region surveillance video data under visible light, and extracting image from each frame, to obtain a true value of a ship position, a length of a ship and a width of the ship; and then using a canny operator to perform an edge detection, to obtain all the edges in the image to act as a fourth dimension of the image;

step B: acquiring a ship area, which includes performing Hough transformation on the edge obtained in the step A to obtain a coastline, and regarding a sea surface area as the ship area;

step C: constructing a Faster RCNN-like convolutional network as a deep learning network, and inputting the processed image obtained in the step A into the deep learning network as sample data, to obtain a convoluted feature map;

step D: constructing a RPN network, generating region proposal boxes of different sizes in the ship area by using a sliding window on the basis of the convoluted feature map obtained in the step C, combining the region proposal boxes with the deep learning network obtained in the step C, and training the RPN network according to an actual position of a ship to obtain a trained model; and step E: using the trained model obtained in the step D to detect the ship, which includes performing an edge detection on a detected image to obtain all the edges of the image to act as the fourth dimension of the image, then obtaining the coastline through Hough transformation, and performing ship detection on a part of the detected image which is located between the coastlines on the basis of the trained model obtained in the step D.

Moreover, in the step B, a two-dimensional array of a ($\lambda$, $\theta$) polar coordinate parameter space is established as an accumulator firstly, all target pixels in the image are searched sequentially, when a corresponding position is found in the parameter space for each target pixel, added 1 to a corresponding position of the accumulator; then, a maximum value in the parameter space accumulator is calculated and a position of the parameter space is set as ($\lambda^i$, $\theta^i$); and finally, corresponding straight line parameters in an image space are found out through the position ($\lambda^i$, $\theta^i$) of the parameter space, and a longest straight line is determined as the coastline. Furthermore, in the step D, after the region proposal boxes of different sizes are generated in the ship area by using the sliding window, a size of the selected region proposal box is obtained through K-means clustering according to the length and the width of the ship obtained in the step A.

The disclosure provides a ship detection system based on multidimensional scene features for constructing a deep learning network model, including the following modules:

a first module configured to construct a ship image sample database, which includes collecting coastal region surveillance video data under visible light, and extracting image from each frame, to obtain a true value of a ship position as well as a length and a width of the ship; and then using a canny operator for edge detection, to obtain all the edges in the image to act as a fourth dimension of the image;

a second module configured to acquire a ship area which includes performing Hough transformation on the edge obtained by the first module to obtain a coastline, and making a sea surface area be the ship area;

a third module configured to construct a Faster RCNN-like convolutional network to act as a deep learning network, and input the processed image obtained by the first module into the deep learning network to act as sample data, to obtain a convoluted feature map;

a fourth module configured to construct a RPN network, generate region proposal boxes of different sizes in the ship area by using a sliding window on the basis of the convoluted feature map obtained by the third module, combine the region proposal boxes with the deep learning network obtained by the third module, and train according to an actual position of a ship to obtain a trained model; and a fifth module configured to use the trained model obtained by the fourth module to detect test data, which includes performing edge detection on the detected image to obtain all the edges of the image to act as the fourth dimension of the image, then obtaining the coastline through Hough transformation, and performing ship detection on a part of the detected image between the coastlines on the basis of the trained model obtained by the fourth module.

Moreover, in the second module, a two-dimensional array of a ($\lambda$, $\theta$) polar coordinate parameter space is established as an accumulator firstly, all target pixels in the image are searched sequentially, a corresponding position is found in the parameter space for each target pixel, and 1 is added to a corresponding position of the accumulator; then, a maximum value in the parameter space accumulator is calculated and a position of the accumulator is set as ($\lambda^i$, $\theta^i$); and finally, corresponding straight line parameters in an image space are found out through the position ($\lambda^i$, $\theta^i$) of the parameter space according to an equation above, and a longest straight line is determined as the coastline.

Furthermore, in the fourth module, after the region proposal boxes of different sizes are generated in the ship area by using the sliding window, a size of the selected region proposal box is obtained through K-means clustering according to the length and the width of the ship obtained by the first module.

The disclosure provides an electronic device, comprising: a memory having instructions stored thereon; a processor configured to execute the instructions to perform operations for for ship detection based on multidimensional scene features, the operations comprising:

step A: constructing a ship image sample database, which comprises collecting coastal region surveillance video data under visible light, and extracting image from each frame, to obtain a true value of a ship position, a length of a ship and a width of the ship; and then using a canny operator to perform an edge detection, to obtain the edges in the image to act as a fourth dimension of the image;

step B: acquiring a ship area which comprises performing Hough transformation on the edge obtained in the step A to obtain a coastline, and regarding a sea surface area as the ship area;

step C: constructing a Faster RCNN-like convolutional network as a deep learning network, and input the processed image obtained in the step A into the deep learning network as sample data, to obtain a convoluted feature map;

step D: constructing a RPN network, generate region proposal boxes of different sizes in the ship area by using a sliding window on the basis of the convoluted feature map obtained in the step C, combine the region proposal boxes with the deep learning network obtained in the step C, and train the RPN network according to an actual position of a ship to obtain a trained model; and step E: using the trained model obtained in the step D to detect test data, which comprises performing an edge detection on the detected image to obtain the edges of the image to act as the fourth dimension of the image, then obtaining the coastline through Hough transformation, and performing ship detection on a part of the detected image which is located between the coastlines on the basis of the trained model obtained in the step D.

The technical solutions provided by the disclosure have the following beneficial effects.

(1) According to the actual data, buildings on lands are the main reason for false detection of ships. By extracting the coastline, the patent avoids interference by the buildings on land and performs region proposal boxes on the ship area only, thus increasing a accuracy and a speed of the region proposal boxes.

(2) Edge features are added to target detection to act as the fourth dimension of the image, which increases a detection precision and a detection speed. The method still has good detection results for complex scenes such as cloudy, foggy and overcast days and the like, and has high robustness. The disclosure can be used for improving a working efficiency on marine supervision, saving a supervision cost, providing a scientific basis for making marine management decisions meanwhile, and has an important market value.

DETAILED DESCRIPTION OF THE EMBODIMENTS

The disclosure provides a ship detection method combined with scene features and based on deep learning network. Firstly, an image sample database is constructed, and sample labeling is performed on ship images to obtain sufficient samples. Then a coastline is obtained through edge detection and Hough transformation. Meanwhile, an edge detection result is taken as a fourth dimension of the image, and a deep learning network is constructed to convolve the image. After that, region proposal boxes are generated in an area between the coastlines by using a sliding window because ships only appear on a water surface in an around-island image, while the region proposal methods of other deep learning methods are all to make region proposal for the whole image. Then a loss function of the region proposal boxes is obtained by using a true value of a ship position to train the entire network and output a trained model. Finally, the trained model is used to detect the ship. The method mainly includes four processes: sample database construction, coastline extraction, deep learning network training and ship detection. In order to explain the specific embodiment in detail, referring to FIG. 1, a flow chart of the embodiment is as follows.

Figure 1:
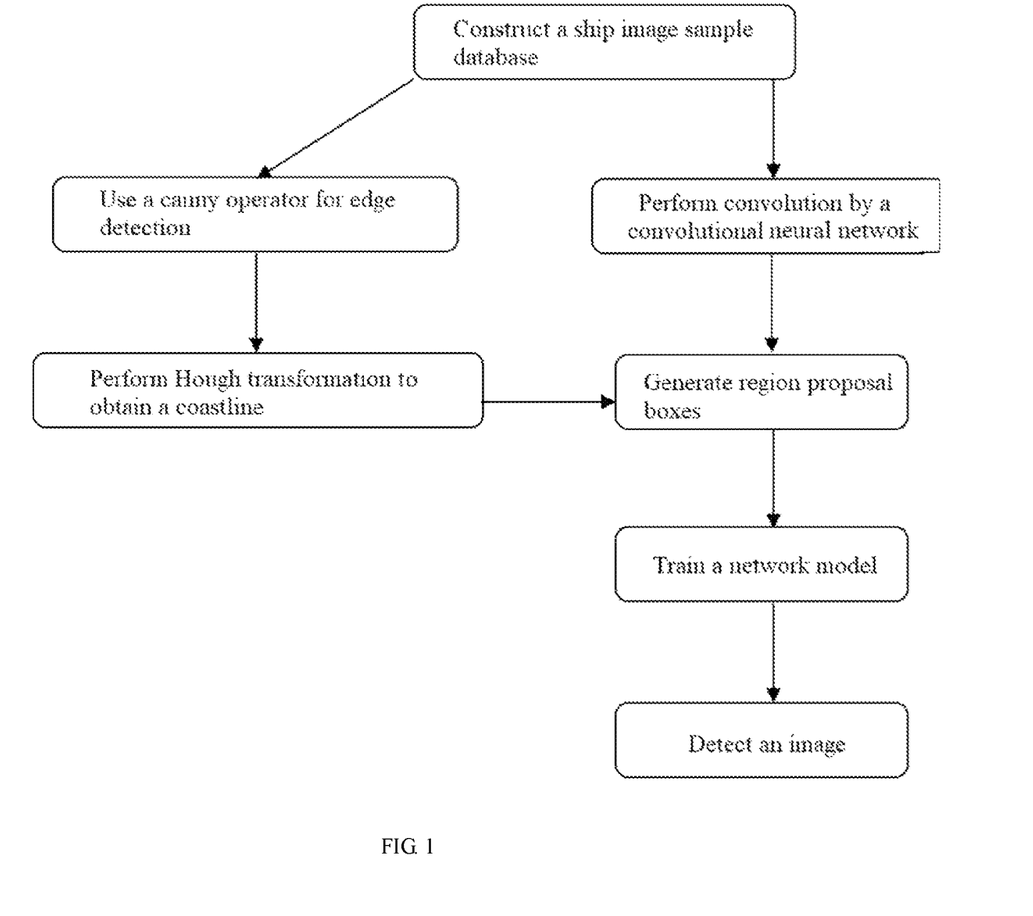
FIG. 1 is a flow chart of an embodiment of the disclosure.

In step A, constructing a ship image sample database is constructed; performing an edge detection by a canny operator, and an obtained edge detection result of an image is called a wave band E, and acted as a fourth dimension of the image, and the image is changed from representation of (R, G, B) to representation of (R, G, B, E).

Firstly, a ship image is prepared, and data required to be collected by the disclosure is mainly coastal area surveillance video data under visible light. In specific implementation, the data may be constructed in advance. For the collected video data, it is necessary to obtain each frame of image through a decoder or a code. For multiple videos, a ship image sample database with sufficient diversities is obtained. Then each frame of image in the ship image sample database is labeled by pre-selection to obtain a true value of a ship position as well as a length and a width of the ship.

The canny operator is used for detection to obtain an edge of each frame of image in the ship image sample database. An edge pixel is assigned with 255 (black) and other pixels are assigned with 0 (white). The edge is acted as the fourth dimension E of the image, and the image is changed from the representation of (R, G, B) to the representation of (R, G, B, E). In the embodiment of the present invention, besides using red, green and blue to recognize and determine the image pixels, a fourth-dimension E is further introduced herein, by learning the edge character about the pixels. The network may recognize the ship better based on the edge character. The following processes are included.

(1) Firstly, the image is smoothed by a Gaussian filter, wherein a Gaussian smoothing function is:

$$H(x, y) = e^{-\frac{x^2+y^2}{2\sigma^2}}$$

wherein, x and y are coordinates of image points, which can be considered as integers in image processing, and σ is standard deviation.

(2) A 3*3 template H is generated through a Gaussian smoothing function, wherein f is an original image, and then the image is blurred by using the template H to obtain a smoothed image G, in order to avoid noise interfere to the edge points:

$$G(x,y) = f(x,y) * H(x,y)$$

(3) A finite difference of a first partial derivative is used to calculate a magnitude and a direction of a gradient. A first order differential convolutional template is as follows:

$$H_1 = \begin{vmatrix} -1 & -1 \\ 1 & 1 \end{vmatrix}, H_2 = \begin{vmatrix} 1 & -1 \\ 1 & -1 \end{vmatrix}$$

Values in a vertical direction and a horizontal direction are calculated respectively, and then the magnitude of the gradient is as follows:

$$\varphi_1(m,n) = f(m,n) * H_1(x,y)$$

$$\varphi_2(m,n) = f(m,n) * H_2(x,y)$$

$$\varphi(m,n) = \sqrt{\varphi_1^2(m,n) + \varphi_2^2(m,n)}$$

the direction of the gradient is as follows:

$$\theta_\varphi = \tan^{-1}\frac{\varphi_2(m,n)}{\varphi_1(m,n)}$$

(4) Non-maximum suppression is performed on the magnitude of the gradient. It is not enough to determine the edge by only obtaining a global gradient; therefore, a point with maximum local gradient has to be retained to suppress the non-maximum value in order to determine the edge. Besides the point with maximum gradient, all the points are retained. At each point, a central pixel M of a neighborhood is compared to two pixels along a gradient line. If a gradient value of the M is not greater than gradient values of two adjacent pixels along the gradient line, then let M=0.

(5) A double threshold algorithm is used to detect and connect the edge. Two thresholds th1 and th2 are applied to the non-maximum suppression image, and a relationship between the two thresholds is generally that th1=0.4th2. In this patent, a gray value of a pixel with a gradient value less than th1 is set as 0 to obtain an image a. Then, a gray value of a pixel with a gradient value less than th2 is set as 0 to obtain an image b. Since the threshold of the image b is greater, most noises are removed, but useful edge information is lost meanwhile. While much information of the image A is retained since the image a has a lower threshold. In this patent, the edges of the images can be connected by using the image b as a basis and using the image a as a supplement. In each image, all the pixels inside the image besides the 0 point are edges. The edges obtained in image b is reliable but not complete, based on the edges obtained in image b, the edges are completed according to the edges of the image a.

(6) The image is processed. The edge pixel is assigned with 255 (black) and other pixels are assigned with 0 (white). The edge is acted as the fourth dimension E of the image, and the image is changed from the representation of (R, G, B) to the representation of (R, G, B, E).

In step B, a ship area is acquired. Hough transformation is performed on the edge E obtained in the step A to obtain a coastline, and a sea surface area is regarded as the ship area.

In order to reduce a calculation amount, the disclosure proposes to firstly establish a two-dimensional array of a ($\lambda$, $\theta$) polar coordinate parameter space, and the array is equivalent to an accumulator. Based on an idea of point-line duality, in the image, an equation of all straight lines through a point (x,y) is:

$$y = k * x + b$$

wherein, k is a slope, and b is an intercept.

In the parameter space, the straight line can be expressed as a point, and expressed in polar coordinates as:

$$\lambda = x \cos\theta + y \sin\theta$$

wherein, $\lambda$ is a distance from the point to a pole, $\theta$ is an included angle between a line connecting the point and the pole and a horizontal axis. Therefore, each point in an image space can be regarded as a corresponding curve thereof in the parameter space.

All target (black) pixels in the image are searched sequentially, a corresponding position is found in the parameter space for each target pixel according to the equation above, and then 1 is added to a corresponding position of the accumulator. That is, the coordinate (x,y) of the target pixel is obtained, then the target position under the ($\lambda$,$\theta$) coordinate parameter space may be calculated according to the coordinate (x,y), then the accumulator is added by 1 to the polar coordinate of the target position. The target pixel point is an edge pixel point.

Then, a maximum value in the parameter space (accumulator) is calculated and a position of the parameter space is ($\lambda^1$, $\theta^1$).

Finally, corresponding straight line parameters in the image space are found out through the position ($\lambda^i$, $\theta^i$) of the parameter space according to the equation above. Since cameras takes picture of a sea surface on a coast, only one coastline can be displayed in each image, so the longest straight line is the coastline sealed in this patent application. The sea surface area can be obtained according to the coastline and acted as the ship area, which is beneficial to subsequent generation of the region proposal boxes.

In step C, a Faster RCNN-like convolutional network is constructed as a deep learning network, and the processed image obtained in the step A is inputted into the deep learning network as sample data, to obtain a convoluted feature map.

A network structure of the Faster RCNN-like deep learning network used consists of five convolution layers, three maximum pooling layers and two fully connected layers.

For an ordinary convolutional layer, a feature layer of a previous layer is convolved by a learnable convolution kernel, and then an output feature layer can be obtained through an activation function. Each output layer may be a value of a combination of multiple input convolution layers:

$$X_j^l = f\left(\sum_{i \in M_j} X_i^{l-1} * k_{ij}^l + b_j^l\right)$$

wherein, $M_j$ represents a set of selected input layers, i is an index value of an input layer unit, j is an index value of an output layer unit, $k_{ij}^l$ represents a weight between the input layer and the output layer, b represents an activation bias between the layers, f( ) represents an activation function of the output layer, $X_j^l$ represents an $j^{th}$ output layer of an $l^{th}$ layer, and $X_i^{l-1}$ represents an $i^{th}$ input layer of an $l-1^{th}$ layer.

For the pooling layers, there will be N output layers if there are N input layers, but each output layer becomes smaller.

$$X_j^i = f(\beta_j^l \text{down}(X_j^{i-1}) + b_j^i)$$

down( ) represents a downsampling function, which sums all pixels in different n*n regions of the inputted image generally. In this way, the outputted image is reduced by n times in two dimensions. Each output layer corresponds to a multiplicative bias $\beta_j^i$ and an additive bias $b_j^i$ thereof, wherein $x_j^i$ represents the $j^{th}$ output layer of the $l^{th}$ layer, and $x_j^{i-1}$ represents a $h^{th}$ input layer of the $l-1^{th}$ layer.

For the outputted fully connected layer, the convolution is input to multiple feature layers, and then these convolution values are summed to obtain an output layer, which usually has a better effect. In this patent application, $\alpha_{ij}$ is used to represent a weight or contributions of an $i^{th}$ input layer in the $j^{th}$ outputted feature layer obtained. In this way, an $l^{th}$ output layer may be represented as:

$$X_j^l = f\left(\sum_{i=1}^{N_{in}} \alpha_{ij}(X_j^{l-1} * k_i^l) + b_j^l\right)$$

The following constraint needs to be met:

$$\sum_i \alpha_{ij} = 1, \text{ and } 0 \leq \alpha_{ij} \leq 1.$$

wherein, $N_{in}$ represents a number of inputted feature layers, $k_j^i$ represents a weight between the input layer and the output layer, $b_j^i$ represents the activation bias between the layers, $X_j^i$ represents the $j^{th}$ output layer of the $l^{th}$ layer, and $X_i^{i-1}$ represents the $i^{th}$ input layer of the 1-1$^{th}$ layer.

In step D, constructing a RPN network, region proposal boxes of different sizes are generated in the ship area by using a sliding window on the basis of the convoluted feature map obtained in the step C, a size of the selected region proposal box is obtained through K-means clustering according to the length and the width of the ship obtained in the step A, and the region proposal box is combined with the deep learning network obtained in the step C, and training is performed according to an actual position of a ship to obtain a trained model.

Figure 2:
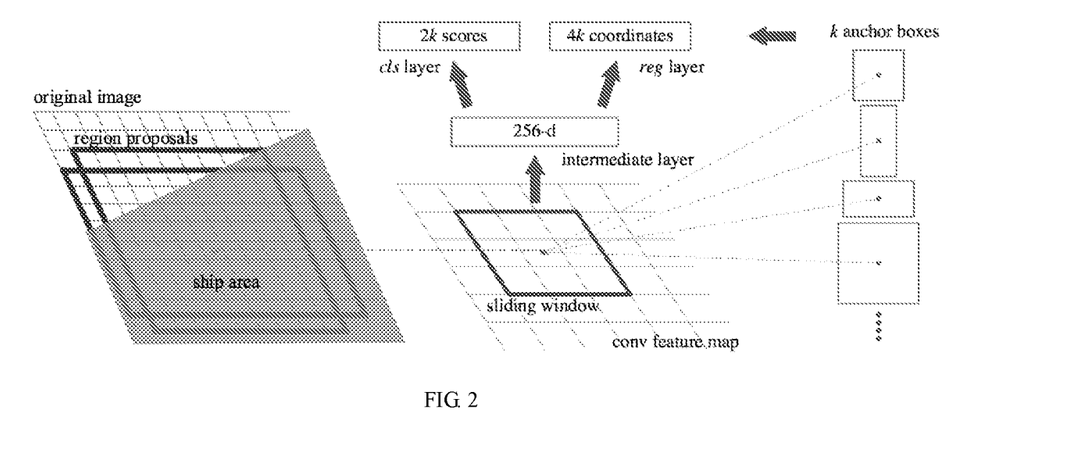
FIG. 2 is a schematic structure diagram for generating region proposal boxes by using a sliding window according to an embodiment of the disclosure.

A structure for generating the region proposal box by using the sliding window is shown in FIG. 2, wherein anchor boxes may be understood as anchor points located at a center of the sliding window, the "sliding window" is the sliding window," conv feature map" is the convoluted feature map obtained in the step C, and "intermediate layer" is an intermediate layer in front of the fully connected layer. 256-d refers to a fully connected feature with a 256-dimensional length generated by the region proposal box, cls layer is a fully connected layer for predicting category, and reg layer is a fully connected layer for predicting position. Assuming that there are k region proposals boxes, 2 k scores refers to 2 k category scores that are correspondingly outputted, and 4 k coordinates refers to 4 k position coordinates that are correspondingly outputted. "ship area" is the ship appearing area, "region proposal boxes" is the region proposals boxes, and "original image" is an original image. Sliding is performed on the convoluted feature map obtained in the step C, the size of the region proposal box is obtained through K-means clustering according to the true length and the width of the ship obtained in the step A, then the true position of the ship obtained in the step A is used to teach a loss function, and then the region proposal box is combined with the deep learning network obtained in the step C, and the combined network is trained, and a trained model is finally outputted. A back propagation algorithm (BP algorithm) neural network mode is mainly used for updating. In the embodiment, a sliding window with a fixed size of 3*3 is used to slide on the last convolutional layer of the deep learning network in the step C. A central position of the sliding window is mapped back to an original inputted image, and a corresponding pixel is considered as a central position of the anchor, and whether the central position is in the ship area obtained in the step B is determined. If the central position is not in the ship area, the central position is discarded, and then the sliding window is slidded downwards. This is because that in the present application is intended to predict the region proposal boxes, and combine with the coastline to reduce unnecessary region proposal boxes. Region suggestion boxes of different scales and different length-width ratios can be obtained by using an anchor mechanism and border regression, thus solving scale problems.

Each anchor here corresponds to a kind of length-width ratio and a kind of scale. According to the embodiment of the disclosure, length-width ratios and scales of the ships with labeled samples are recorded, the length-width ratios of the ships with maximum frequency is clustered by a K-means clustering method, and five types are selected, so that there are five anchors in total. Finally, the five anchors are outputted to the two fully connected layers, and a position and a score of the target region proposal boxes can be predicated at the same time.

The loss function during training is divided into a loss function for evaluating the positioning of region proposal boxes and a loss function for evaluating classification: the loss function for evaluating the positioning of region proposal boxes is as follows:

$$L_{loc}(t^k, v) = \sum_{i=x,y,w,h} smooth_{L1}(t_i^k - v_i)$$

wherein, $t^k=(t_x^k, t_y^k, t_w^k, t_h^k)$ is a predicted translation scaling parameter corresponding to the true value of the compared ship position, k represents a category number, $t_x^k, t_y^k$ refers to translation with a certain scale relative to the region proposal box, and $t_w^k, t_h^k$ is a height and a width relative to the region proposal box in a logarithmic space. $v=(v_x, v_y, v_w, v_h)$ is a corresponding true translation scaling parameter. A $smooth_{L1}$ loss function is that $$smooth_{L1}(x) = \begin{cases} 0.5x^2 & \text{if } |x| < 1 \\ |x| - 0.5 & \text{otherwise} \end{cases}.$$

The loss function for evaluating classification is determined by a probability corresponding to the true value u of the ship position:

$$L_{cls}(p,u) = -\log p_u$$

wherein, $p=(p_0, p_1, p_2, \ldots p_k)$ is to output a k+1 dimensional discrete array output for each region proposal box.

In step E, the model outputted in the step D is used to detect test data. Before detection, edge detection is performed on the detected image firstly to obtain all the edges in the image, and regard the edges as a fourth dimension of the image. Then a coastline is obtained by Hough transformation, and the image is inputted into the deep learning network to perform ship detection on a part of the detected image between the coastlines according to the parameter obtained by training.

In this step, the outputted model is used to detect the test data. Before detection, the coastline in the image is also detected firstly, and then the ship area is detected. The processing method for the detected image acted as the test data is consistent with the processing method for the sample image in the steps a and b. In specific implementation, a threshold value for a true-value overlapping may be set, and if the value is greater than the threshold, then the ship is outputted as a target ship.

In conclusion, the image sample database is constructed firstly, and sample labeling is performed on the ship images to obtain sufficient samples. Then the coastline is obtained through the edge detection and Hough transformation. Meanwhile, the detected edges are taken as the fourth dimension of the image, and the deep learning network is constructed to perform convolution operation on the image. After that, the region proposal boxes are generated in the ship area by using the sliding window and the size of the region proposal box is obtained by K-means clustering, because the ships only appear on the water surface in the roundabout image, while the region proposal methods of other deep learning methods are all to make region proposal for the whole image. Then the loss function of the region proposal box is obtained by using the true value of the ship position to train the entire network and output the trained model. Finally, the trained model is used to detect the test data. The method of the disclosure utilizes the coastline features to reduce the time for generating the region proposal box, improves a recall rate of the region proposal box, and improves a precision and an efficiency of the final detection result.

So far, the detailed implementation process of the ship detection method based on multidimensional scene features for constructing the deep learning network model used in the patent has been completely introduced.

In specific implementation, the flow can be automatically operated through the method provided by the disclosure on the basis of a software technology, and a corresponding system can also be realized by adopting a modularization mode. The embodiments of the disclosure provide a ship detection system based on multidimensional scene features for constructing a deep learning network model, including the following modules:

a first module configured to construct a ship image sample database, which includes collecting coastal region surveillance video data under visible light, and extracting each frame of image, to obtain a true value of a ship position as well as a length and a width of the ship; and then using a canny operator for edge detection, to obtain all the edges in the image to act as a fourth dimension of the image;

a second module configured to acquire a ship area which includes performing Hough transformation on the edge obtained by the first module to obtain a coastline, and making a sea surface area be the ship area;

a third module configured to construct a Faster RCNN-like convolutional network to act as a deep learning network, and input the processed image obtained by the first module into the deep learning network to act as sample data, to obtain a convoluted feature map;

a fourth module configured to construct a RPN network, generate region proposal boxes of different sizes in the ship area by using a sliding window on the basis of the convoluted feature map obtained by the third module, combine the region proposal box with the deep learning network obtained by the third module, and train according to an actual position of a ship to obtain a trained model; and a fifth module configured to use the trained model obtained by the fourth module to detect test data, which includes performing edge detection on the detected image to obtain all the edges of the image to act as the fourth dimension of the image, then obtaining the coastline through Hough transformation, and performing ship detection on a part of the detected image between the coastlines on the basis of the trained model obtained by the fourth module.

The specific implementation of each module can be seen in the corresponding steps, and will not be described in detail in the disclosure.

The specific examples described herein are merely illustrative of the spirit of the disclosure.

Those skilled in the art to which the disclosure belongs can make various modifications or supplements to the specific examples described or replace the specific examples in a similar way without departing from the spirit of the disclosure or exceeding the scope defined in the appended claims.

Each of devices according to the embodiments of the present invention may be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the present invention. The present invention may further be implemented as device program (for example, computer program and computer program product) for executing some or all of the methods as described herein. Such program for implementing the present invention may be stored in the computer readable medium, or have a form of one or more signals. Such a signal may be downloaded from the internet websites, or be provided in carrier, or be provided in other manners.

Figure 3:
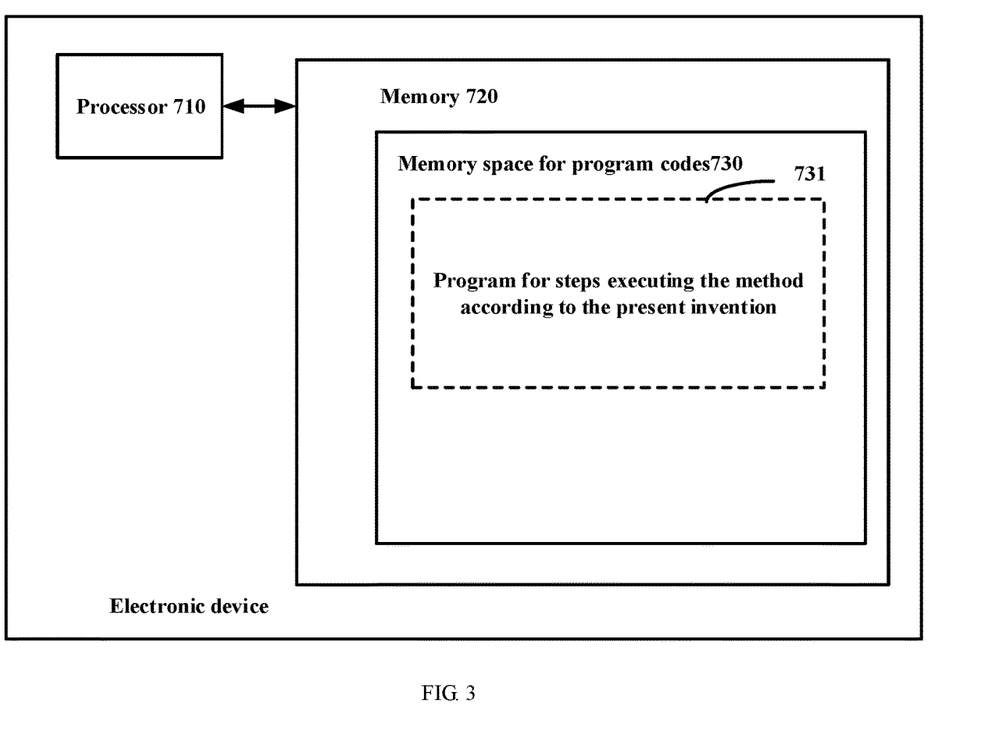
FIG. 3 schematically shows a block diagram of an electronic device used to execute a method according to the present invention.
Figure 4:
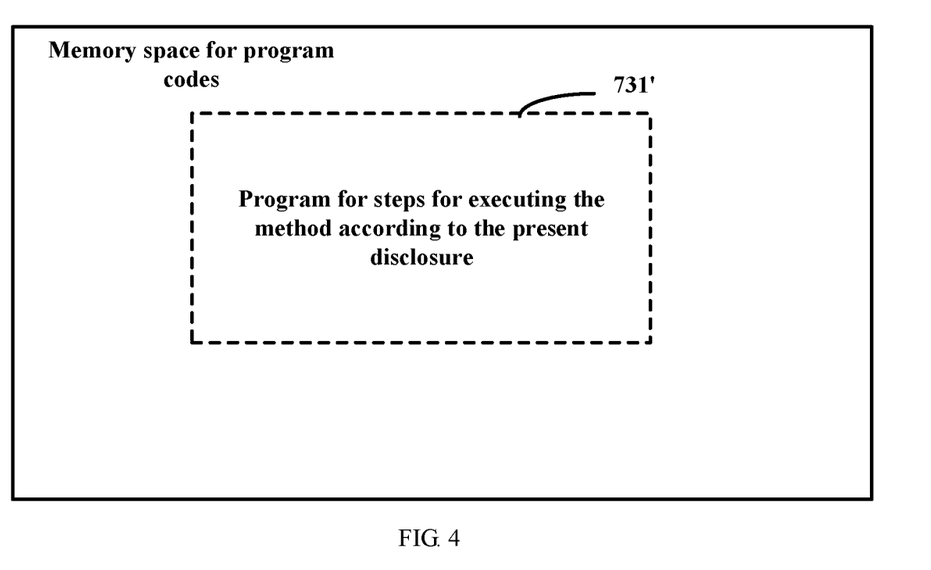
FIG. 4 schematically shows a memory cell used to save or carry program code for realizing the method, according to the present invention.

For example, FIG. 3 is a block diagram of a electronic device for executing the method according to the present invention. Traditionally, the electronic device includes a processor 710 and a computer program product or a computer readable medium in form of a memory 720. The memory 720 could be electronic memories such as flash memory, EEPROM (Electrically Erasable Programmable Read—Only Memory), EPROM, hard disk or ROM. The memory 720 has a memory space 730 for program codes 731 executing any steps in the above methods. For example, the memory space 730 for program codes may include respective program codes 731 for implementing the respective steps in the method as mentioned above. These program codes may be read from and/or be written into one or more computer program products. These computer program products include program code carriers such as hard disk, compact disk (CD), memory card or floppy disk. These computer program products are usually the portable or stable memory cells as shown in FIG. 4. The memory cells may be provided with memory sections, memory spaces, etc., similar to the memory 720 of the electronic device as shown in FIG. 3. The program codes may be compressed, for example, in an appropriate form. Usually, the memory cell includes computer readable codes 731' which may be read, for example, by processors 710. When these codes are operated on the electronic device, the electronic device may execute respective steps in the method as described above.

The "an embodiment", "embodiments" or "one or more embodiments" mentioned in the disclosure means that the specific features, structures or performances described in combination with the embodiment(s) would be included in at least one embodiment of the present invention. Moreover, it should be noted that, the wording "in an embodiment" herein may not necessarily refer to the same embodiment.

Many details are discussed in the specification provided herein. However, it should be understood that the embodiments of the disclosure may be implemented without these specific details. In some examples, the well-known methods, structures and technologies are not shown in detail so as to avoid an unclear understanding of the description.

It should be noted that the above-described embodiments are intended to illustrate but not to limit the present invention, and alternative embodiments may be devised by the person skilled in the art without departing from the scope of claims as appended. In the claims, any reference symbols between brackets form no limit of the claims. The wording "include" does not exclude the presence of elements or steps not listed in a claim. The wording "a" or "an" in front of an element does not exclude the presence of a plurality of such elements. The disclosure may be realized by means of hardware comprising a number of different components and by means of a suitably programmed computer. In the unit claim listing a plurality of devices, some of these devices may be embodied in the same hardware. The wordings "first", "second", and "third", etc. do not denote any order. These wordings may be interpreted as a name.

Also, it should be noticed that the language used in the present specification is chosen for the purpose of readability and teaching, rather than explaining or defining the subject matter of the present invention. Therefore, it is obvious for an ordinary skilled person in the art that modifications and variations could be made without departing from the scope and spirit of the claims as appended. For the scope of the present invention, the publication of the inventive disclosure is illustrative rather than restrictive, and the scope of the present invention is defined by the appended claims.

What is claimed is:

1. A ship detection method based on multidimensional scene features, comprising the following steps:

step A: constructing a ship image sample database, wherein constructing the ship image sample database comprises collecting coastal region surveillance video data under visible light, and extracting an image from coastal region surveillance video data, to obtain a true value of a ship position, a length of a ship and a width of the ship; and then using a canny operator to perform an edge detection, to obtain edges in the image to act as a fourth dimension of the image;

step B: acquiring a ship area, wherein acquiring the ship area comprises performing a Hough transformation on the edges obtained in the step A to obtain a coastline, and regarding a sea surface area as the ship area;

step C: constructing a Faster RCNN-like convolutional network as a deep learning network, and inputting the image obtained in the step A into the deep learning network as sample data, to obtain a convoluted feature map;

step D: constructing a RPN network, generating region proposal boxes of different sizes in the ship area by using a sliding window on the basis of the convoluted feature map obtained in the step C, combining the region proposal boxes with the deep learning network obtained in the step C, and training the RPN network according to an actual position of the ship to obtain a trained model; and step E: using the trained model obtained in the step D to detect test data, wherein detecting the test data comprises performing an edge detection on a detected image from the test data to obtain edges of the detected image to act as a fourth dimension of the detected image, then obtaining the coastline through the Hough transformation, and performing a ship detection on a part of the detected image, the part of the detected image is located between the coastlines on the basis of the trained model obtained in the step D.

2. The ship detection method based on the multidimensional scene features according to claim 1, wherein in the step B, a two-dimensional array of a ($\lambda$, $\theta$) polar coordinate parameter space is established as an accumulator firstly, target pixels in the image are searched sequentially, a corresponding position is found in the ($\lambda$, $\theta$) polar coordinate parameter space for each target pixel, and 1 is added to a corresponding position of the accumulator; then, a maximum value in the accumulator is calculated and a position of the ($\lambda$, $\theta$) polar coordinate parameter space is set as ($\lambda^i$, $\theta^i$); and finally, corresponding straight line parameters in an image space are found out through the position ($\lambda^i$, $\theta^i$) of the ($\lambda$, $\theta$) polar coordinate parameter space, and a longest straight line is determined as the coastline.

3. The ship detection method based on the multidimensional scene features according to claim 1, wherein in the step D, after the region proposal boxes of different sizes are generated in the ship area by using the sliding window, a size of a selected region proposal box is obtained through K-means clustering according to the length and the width of the ship obtained in the step A.

4. A ship detection system based on multidimensional scene features, comprising the following modules:

a first module configured to construct a ship image sample database, wherein constructing the ship image sample database comprises collecting coastal region surveillance video data under visible light, and extracting an image from coastal region surveillance video data, to obtain a true value of a ship position, a length of a ship and a width of the ship; and then using a canny operator to perform an edge detection, to obtain edges in the image to act as a fourth dimension of the image;

a second module configured to acquire a ship area, wherein acquiring the ship area comprises performing a Hough transformation on the edges obtained by the first module to obtain a coastline, and regarding a sea surface area as the ship area;

a third module configured to construct a Faster RCNN-like convolutional network as a deep learning network, and input the image obtained by the first module into the deep learning network as sample data, to obtain a convoluted feature map;

a fourth module configured to construct a RPN network, generate region proposal boxes of different sizes in the ship area by using a sliding window on the basis of the convoluted feature map obtained by the third module, combine the region proposal boxes with the deep learning network obtained by the third module, and train the RPN network according to an actual position of the ship to obtain a trained model; and a fifth module configured to use the trained model obtained by the fourth module to detect test data, wherein detecting the test data comprises performing an edge detection on a detected image from the test data to obtain edges of the detected image to act as a fourth dimension of the detected image, then obtaining the coastline through the Hough transformation, and performing a ship detection on a part of the detected image, the part of the detected image is located between the coastlines on the basis of the trained model obtained by the fourth module.

5. The ship detection system based on the multidimensional scene features according to claim 4, wherein in the second module, a two-dimensional array of a ($\lambda$, $\theta$) polar coordinate parameter space is established as an accumulator firstly, target pixels in the image are searched sequentially, a corresponding position is found in the ($\lambda$, $\theta$) polar coordinate parameter space for each target pixel, and 1 is added to a corresponding position of the accumulator; then, a maximum value in the accumulator is calculated and a position of the accumulator is set as ($\lambda^i$, $\theta^i$); and finally, corresponding straight line parameters in an image space are found out through the position ($\lambda^i$, $\theta^i$) of the accumulator, and a longest straight line is determined as the coastline.

6. The ship detection system based on the multidimensional scene features according to claim 4, wherein in the fourth module, after the region proposal boxes of different sizes are generated in the ship area by using the sliding window, a size of a selected region proposal box is obtained through K-means clustering according to the length and the width of the ship obtained by the first module.

7. The ship detection method based on the multidimensional scene features according to claim 2, wherein in the step D, after the region proposal boxes of different sizes are generated in the ship area by using the sliding window, a size of a selected region proposal box is obtained through K-means clustering according to the length and the width of the ship obtained in the step A.

8. The ship detection system based on the multidimensional scene features according to claim 5, wherein in the fourth module, after the region proposal boxes of different sizes are generated in the ship area by using the sliding window, a size of a selected region proposal box is obtained through K-means clustering according to the length and the width of the ship obtained by the first module.

\* \* \* \* \*